US010808881B1

(12) United States Patent
Phillips et al.

(10) Patent No.: US 10,808,881 B1
(45) Date of Patent: Oct. 20, 2020

(54) STRUCTURE BASE WITH PIVOT BOLTS (71) Applicant: Christie Lites Enterprises Canada Inc., Toronto, Ontario (CA)

(72) Inventors: John Phillips, Orlando, FL (US); Eustaquio Rates, Orlando, FL (US)

(73) Assignee: Christie Lites Enterprises Canada Inc., Toronto (CA)

( * ) Notice: Subject to any disclaimer, the term of this patent is extended or adjusted under 35 U.S.C. 154(b) by 0 days.

(21) Appl. No.: 16/454,779

(22) Filed: Jun. 27, 2019

(51) Int. Cl.
*F16M 13/00* (2006.01)
*F16M 11/22* (2006.01)

(52) U.S. Cl.
CPC ......... *F16M 11/22* (2013.01); *F16M 2200/08* (2013.01)

(58) Field of Classification Search
CPC ........... A63H 33/08; B23Q 1/032; B23Q 1/28
See application file for complete search history.

(56) References Cited

U.S. PATENT DOCUMENTS

| 5,190,273 | A | * | 3/1993 | Salvagnini | B23Q 3/103 269/101 |
| 6,264,186 | B1 | * | 7/2001 | Hill | B23Q 1/032 269/289 R |
| 10,603,750 | B1 | * | 3/2020 | Taylor | B23Q 1/28 |

* cited by examiner

Primary Examiner — Amy J. Sterling
(74) Attorney, Agent, or Firm — DLA Piper LLP (US)

(57) ABSTRACT

A base plate assembly is provided for supporting a structural member on a floor surface. The base plate assembly has a substantially planar base plate, having one or more holes through the base plate. There are also one or more supports to support the base plate above the floor surface, forming a cavity between the base plate and the floor surface. There are one or more bolt retainer assemblies each having a bolt, associated with one of the one or more holes. Each bolt retainer assembly has an engaged orientation retaining the bolt through the hole and an retracted orientation retaining the bolt within the cavity and not through the hole.

13 Claims, 9 Drawing Sheets

FIG. 1

Prior Art

STRUCTURE BASE WITH PIVOT BOLTS

FIELD

Embodiments disclosed generally relate to a structure base for a support structure.

BACKGROUND

Support trusses are often assembled on temporary surfaces. Therefore, there is often a need for a support base for a truss.

It is desirable that a support base be easy to attach to trusses and not be in the way for people and equipment near the trusses.

SUMMARY

A base plate assembly is provided for supporting a structural member on a floor surface. The base plate assembly has a substantially planar base plate, having one or more holes through the base plate. There are also one or more supports to support the base plate above the floor surface, forming a cavity between the base plate and the floor surface. There are one or more bolt retainer assemblies each having a bolt, associated with one of the one or more holes. Each bolt retainer assembly has an engaged orientation retaining the bolt through the hole and a retracted orientation retaining the bolt within the cavity and not through the hole.

BRIEF DESCRIPTION OF THE DRAWINGS

In drawings which illustrate by way of example only embodiments of the disclosure.

DETAILED DESCRIPTION

In an embodiment, structural members may need to be supported on a floor surface. The structural members may be support posts, girders, trusses, rigging or other members requiring support from a base plate. In an embodiment, the structural member is a support for staging, such as a lighting truss. The structural members may be temporary or semi-permanent.

The structural member may be supported using a structure base, such as a base plate assembly or base plate, on a floor surface that is substantially horizontal. The floor surface may not have any mounting points, secure points or foundations for supporting a structural member.

As the structural members may be temporarily or semi-permanently installed, it is beneficial that it is efficient to assemble and disassemble the structural member from the base plate. It is preferred that all the hardware for connecting the structure base to the structural member be integrated with or attached to the base plate and/or structural member. In this way, the need for separate components is reduced. This reduces the need to have the right amount of connecting components for the assembly along with the assembly as well as the requirement to locate the connecting components at the time of assembly.

Figure 1:
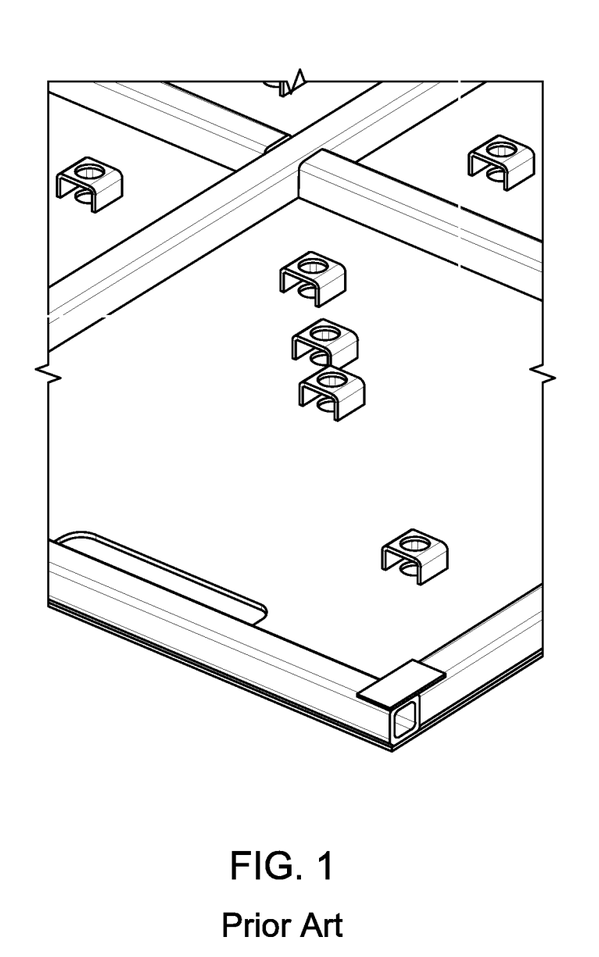
FIG. 1 is a perspective view of the underside of a prior art structure base

With reference to FIG. 1, a structure base without the benefit of the present disclosure may only have nut retainers on the undersurface for holding and retaining nuts. Bolts supplied at the time of installation may be received from the top surface to affix a structural member to the structure base.

The base plate may be affixed to the structural member using one or more bolts. Corresponding nuts may be used secure the bolts. The structural members may have captured nuts so that they are not lost, misplaced or need to be separately handled during assembly or disassembly.

The base plate preferably has a low profile when placed on the floor. In other words, the height of the base plate from the floor surface is preferably minimized. Having a low profile increases stability and reduces the likelihood of people or equipment impacting the base plate. Reducing impact with the base plate reduces the chances of injury and damage to equipment, the base plate or the structure.

As will be described below, the base plate may have the points of attachment, such as bolts, integrated with the base plate in such a way that they can be removably affixed to a structural member but retained within the base plate when the base plate is not affixed to the structural member.

In addition, the base plate may be compatible with several different types of structural members, such as structural members of different sizes. In such circumstances, the base plate may have multiple points of attachment to a structural member, only some of which may be needed for a particular structural member. The points of attachment that are not needed for a particular structural member may be retained within the base plate and be in a position that does not interfere with the structural member or the affixing of the points of attachment being used.

Figure 2:
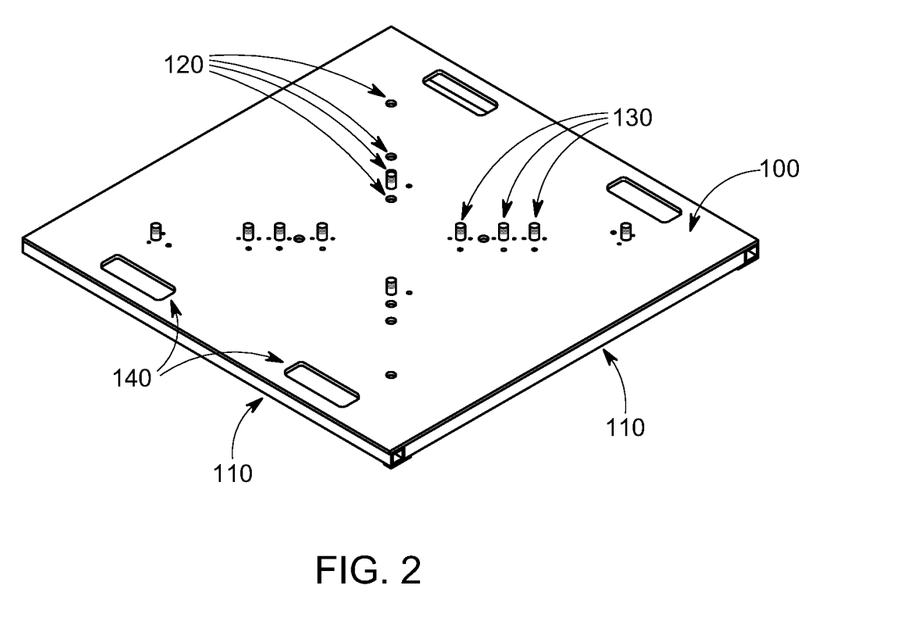
FIG. 2 is a perspective view of a structure base.

With reference to FIG. 2, a base plate 100 may be generally a planar square. The shape may relate to the cross section of a structural member it is designed to work with. For example for structural members with a generally square cross section, the base plate may be generally square.

The base plate may have a thickness defined by the thickness of the base plate 100 and a cavity under the main plate. The cavity is formed by the base plate and one or more supports 110. The one or more supports support the base plate 100 above the floor surface. The one or more supports may be channels, such as square channels. The one or more supports may form a boundary around the cavity such as supporting the edges of the base plate 100. Alternatively, the supports may form one or more feet to support the base plate 100. Covers 112 may cover some or all of the supports, particularly where the support may be in contact with the floor surface. The covers 112 may be made of rubber or similar material to protect the support from the floor surface and/or vice versa, or some other support material, such as a steel plate.

The base plate may have one or more holes 120 for the points of attachment. There may be multiple holes to connect a particular type of structural member to the base plate as well as holes for other types, such as different sizes, of structural members.

There may be holes for both male and female points of attachment. As will be described below, bolts 130 may be retained within the base plate and cavity and in an engaged position pass through some of the one or more holes. The bolts may pass through the holes for the male points of attachment.

In a preferred embodiment, the holes are aligned in two axis with the diagonals of the base plate. The holes on the first axis may be of opposite gender as the holes of the second axis. In other words, where a bolt passes through a hole on the first axis, an unoccupied hole may be present on the second axis. In this way, a structural member with male and female corresponding points of attachment may be attached to the base plate at either 180 degrees of alignment.

The base plate may have one or more handles, such as handle holes 140. Handles allow for the base plate to more easily be carried and positioned by hand. Handle holes 140 may also allow the base plate to be stored on racks or transported on carriers.

Figure 3:
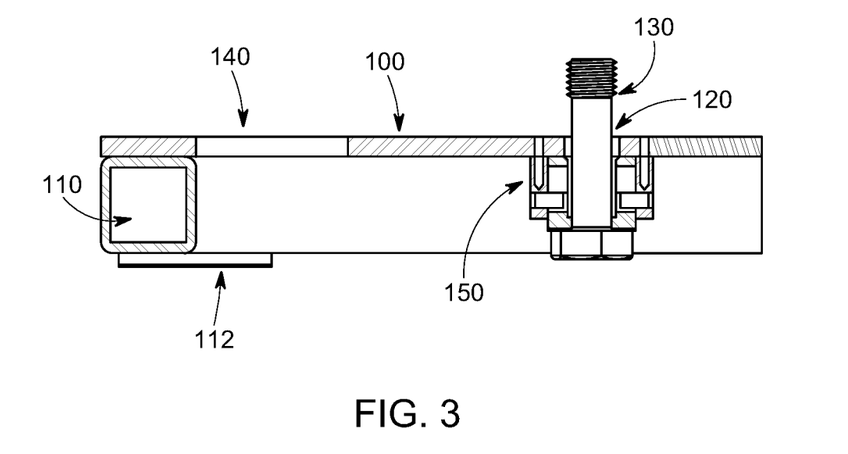
FIG. 3 is a cross-section of a portion of a structure base.

With reference FIG. 3, a cross-section of a portion of the base structure shows the base plate 100 and a support 110. A retained bolt 130 passes through a hole 120 in an engaged orientation. A bolt retainer assembly 150 retains the bolt with the base plate 100. The bolt retainer assembly may be affixed to the underside of the base plate, such as with bolts, clips or welding.

Figure 4A:
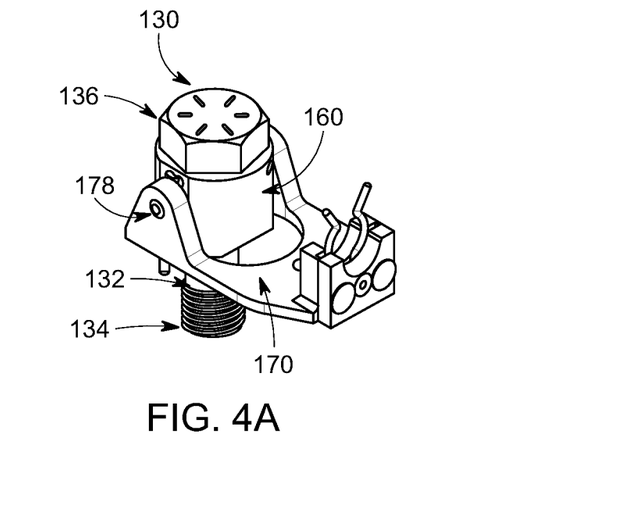
FIG. 4A is a perspective view of a bolt retainer assembly and bolt in an engaged orientation in isolation.
Figure 4B:
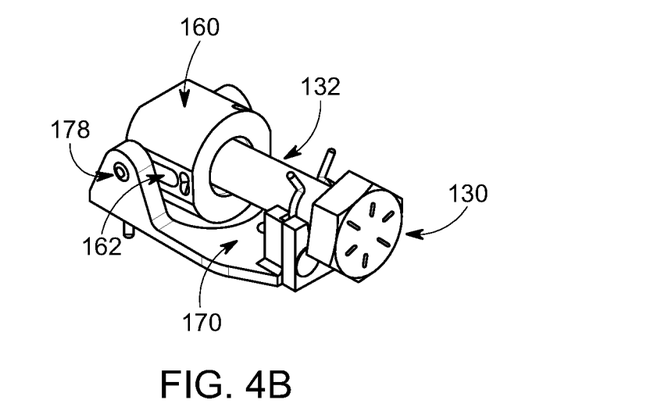
FIG. 4B is a perspective view of a bolt retainer assembly and bolt in a retracted orientation in isolation.
Figure 5:
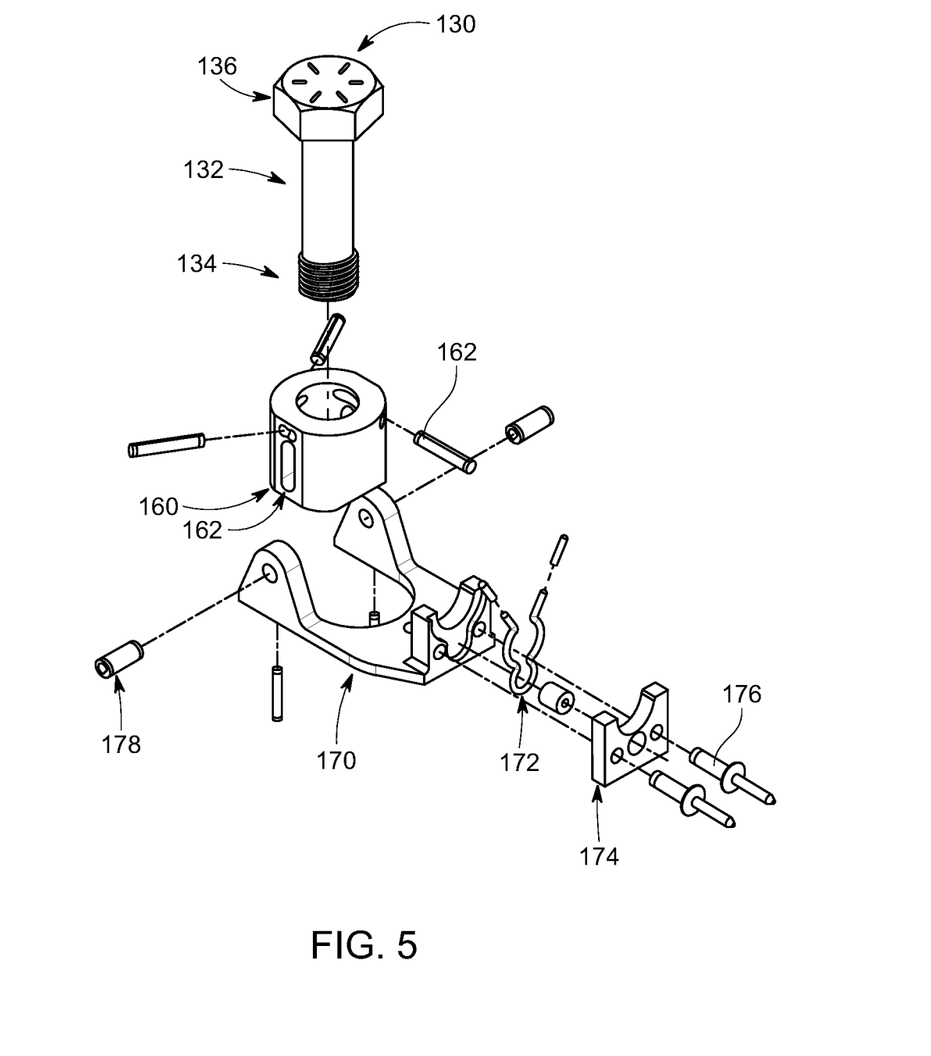
FIG. 5 is a perspective exploded view of a bolt retainer assembly and bolt.

With reference to FIGS. 4A, 4B and 5, a bolt retainer assembly 150 can hold the bolt 130 in an engaged position or in a retracted position. A bolt retainer assembly may include sleeve 160 that is affixed about a pivot point to a retainer clip 170. The retainer clip 170 is affixed to the base plate. The sleeve 160 retains the bolt but allows the bolt to travel through the sleeve such to engage with a structural member.

The sleeve 160 may be held in place to the retainer clip by pivotable slider pins 178 that slide within a groove 162 in the exterior of the sleeve 160. The slider pins and groove allow the sleeve to move relative to the retainer clip. This allows the sleeve to be biased directly against the base plate when the bolt is tightened so that the force of the bolt is applied directly from the sleeve to the base plate rather than through the retainer clip and/or pivot point. The slider pins and groove also allow the sleeve to swing the bolt free of the hole through the base plate to transition to the retracted orientation.

In an embodiment, the bolt 130 has an unthreaded shaft portion 132 having a first diameter and a threaded shaft portion 134 having a second diameter. The threaded shaft portion is at the distal end of the shaft from the bolt head 136 with the unthreaded shaft portion separating the threaded portion and the bolt head. The first diameter is less than the second diameter. The passage through the sleeve has a restriction such that only the unthreaded shaft portion having the first diameter can pass through the restriction but the entire shaft of the bolt may pass through the unrestricted sleeve. In this way the bolt is retained within the sleeve since neither the threaded shaft portion 134 nor the bolt head 136 may pass through the sleeve.

The restriction in the sleeve may be formed in a variety of ways but is preferably added after the bolt is placed through the sleeve during manufacturer. In an embodiment, one or more set screws pass through the wall of the sleeve into the passage forming the restriction. In a second embodiment, one or more slotted spring pins 162 are retained within holes that pass obliquely through the sleeve wall so a portion of the spring pin forms the restriction within the sleeve passage. Preferably three spring pins are used to form the restriction in the sleeve. The spring pins may be added after the bolt has been placed within through the sleeve. In a further embodiment, the sleeve may have a section of internal threads through which the threaded portion of the bolt may be threaded through. In this way, the bolt is retained within the sleeve unless the bolt is unthreaded.

With reference to FIG. 4A, in an engaged position, the bolt passes through the sleeve and through a hole in the base plate. The threaded portion of the shaft can then engage with a structural member. The bolt may be tightened using a suitable wrench using the bolt head. When tightened, the bolt head will bias against the sleeve, which is in contact with the base plate or depending on the embodiment, through pivots and retainer clip 170 to the base plate. In this way, the base plate is secure affixed to the structural member using bolt 130.

With reference to FIG. 4B, in a retracted orientation, the bolt is disengaged from a structural member. The bolt is retracted from the hole through the base plate, while still retained within the sleeve. The sleeve is allowed to rotate approximately 90 degrees such that the head of the bolt is moved closer to the base plate and the bolt is substantially parallel with the surface of the baste plate.

In the retracted orientation, a releasable catch may hold the bolt in the retracted orientation. In an embodiment, the catch comprise a retaining pin 172 affixed to the retaining clip 170 or base plate 100. The retaining pin 172 may be temporarily forced open to accept the bolt, such as by an operator but be biased to a closed position to hold the bolt. The retaining pin may be held by the retaining clip such as using a bracket 174 and rivets 176. The retaining pin may hold the bolt such that the sleeve cannot substantially move to reduce rattling of the sleeve against the retainer clip and base plate.

Figure 7A:
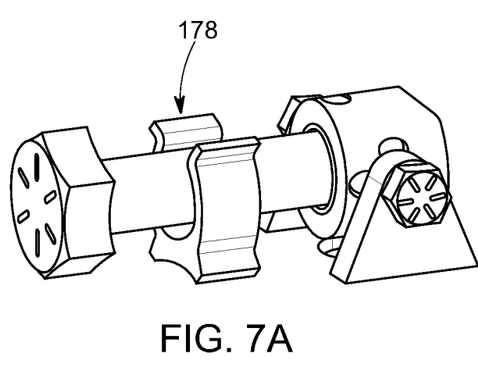
FIGS. 7A, 7B, and 7C are perspective views of a bolt retainer assembly in retracted and engaged orientations.
Figure 7B:
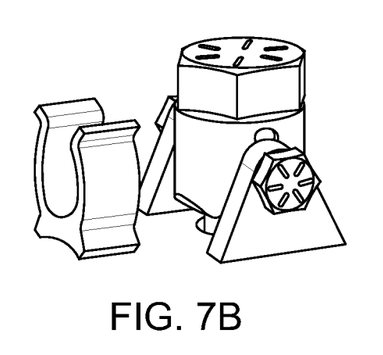
Figure 7C:
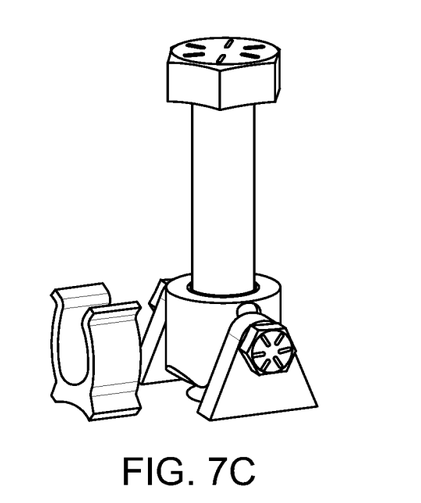

With reference to FIGS. 7A, 7B and 7C, an alternative catch may comprise a spring clip 178 affixed to the base plate 100. With reference to FIG. 7A, in a retracted orientation the spring clip 178 may capture the bolt 130. In an engaged orientation, the bolt may be aligned with a hole in the base plate 100. The bolt 130 may pass through the hole such as when engaged and retaining a structural member to the base plate, with reference to FIG. 7B. During a transition from an engaged orientation to the retracted orientation or vice versa, the bolt may be removed from the hole through the base plate so that the sleeve and bolt can be rotated clear of the base plate. The bolt is retained within the sleeve by the restriction in the sleeve passage.

In the retracted orientation, the bolt retainer assembly may have a low profile such that the assembly is entirely within the cavity beneath the base plate.

For holes in the base plate without bolts and the corresponding bolt retainer assemblies, nuts may be retained against the holes on the underside of the base plate. Nut retaining assemblies 180, such as U-shaped brackets, may be affixed to the base plate to releasably hold the nut and to resist its rotation.

Figure 6:
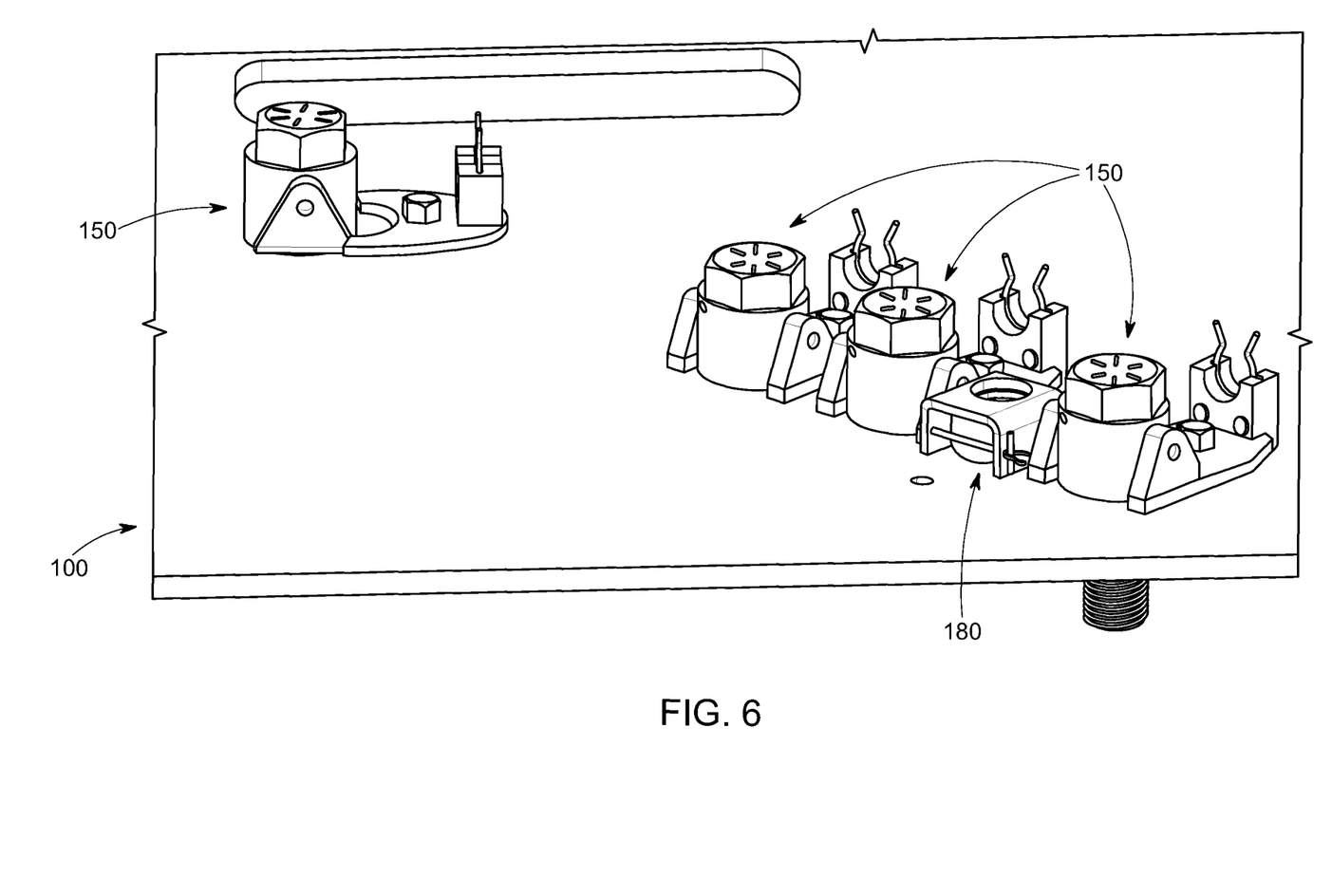
FIG. 6 is a perspective view of a several bolt retainer assemblies and a nut retainer assembly on a base plate.

With reference to FIG. 6, a portion of a base plate 100 may support several bolt retainer assemblies 150 and nut retaining assemblies 180.

Figure 8:
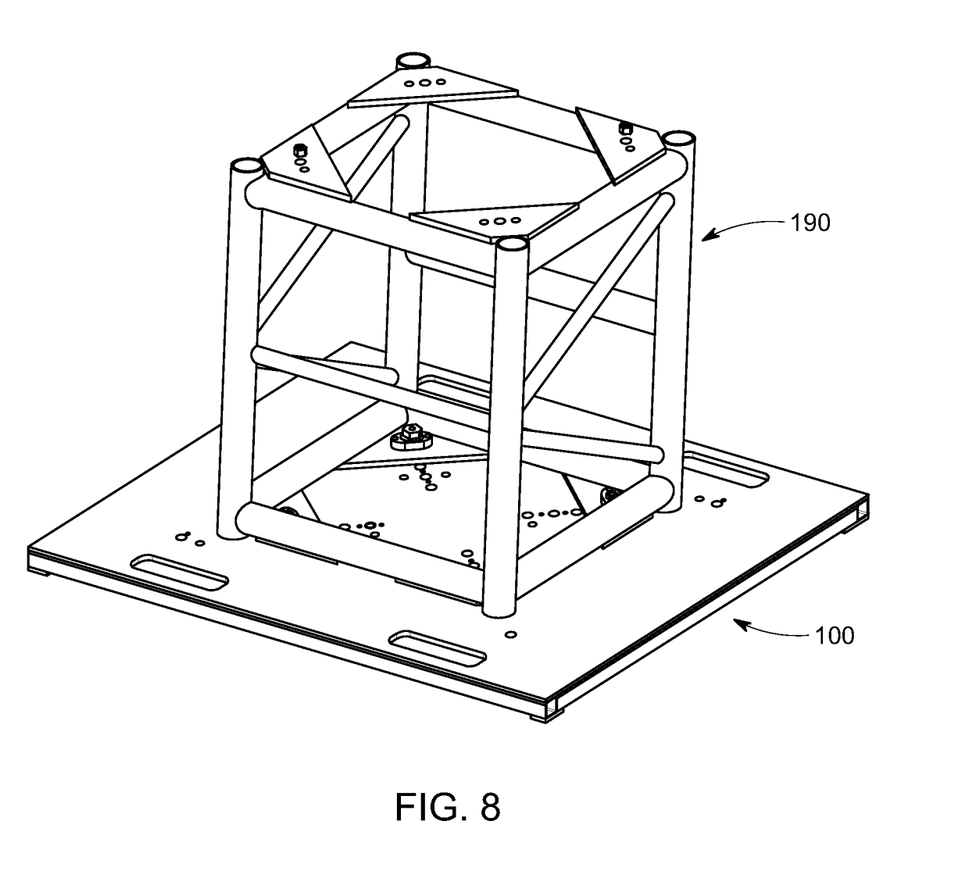
FIG. 8 is a perspective view of a structure base affixed to a truss.
Figure 9:
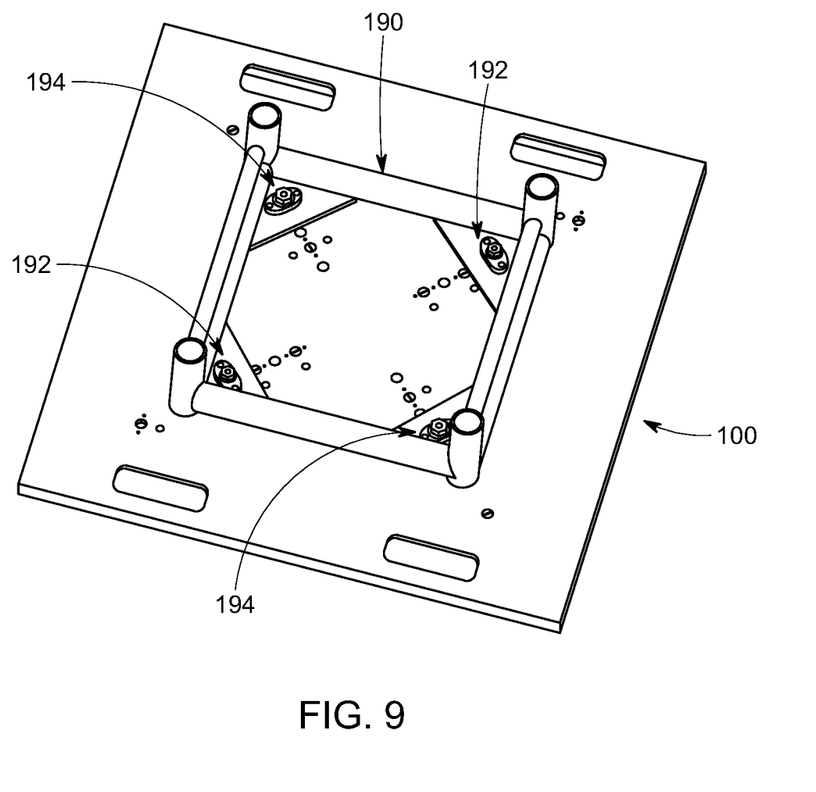
FIG. 9 is a perspective section view of a structure base affixed to a truss.

With reference to FIGS. 8 and 9, when a particular structural member 190 is to be affixed to a structure base, an appropriate set of bolt retainer assemblies 150 may be used suitable for the structure member. The structural member 190 may have both male and female components that correspond to opposite points of attachment on the structure base. The structural member may have female points of attachment 192 that receive the bolts of the bolt retainer assemblies 150 with the bolts in an engaged orientation. The structural member may have male points of attachments 194 with bolts that engage with retained nuts in the structure base. Bolt retainer assemblies that are not used for affixing the structural member to the structure base may be in the retracted orientation. In the retracted orientation, the bolts may not interfere with the structural member.

Various embodiments of the present disclosure having been thus described in detail by way of example, it will be apparent to those skilled in the art that variations and modifications may be made without departing from the disclosure. The disclosure includes all such variations and modifications as fall within the scope of the appended claims.

The invention claimed is:

1. A base plate assembly for supporting a structural member on a floor surface comprising:
   a substantially planar base plate, having one or more holes through the base plate;
   one or more supports to support the base plate above the floor surface, forming a cavity between the base plate and the floor surface; and
   one or more bolt retainer assemblies each having a bolt, associated with one of the one or more holes, each bolt retainer assembly having an engaged orientation retaining the bolt through the hole and an retracted orientation retaining the bolt within the cavity and not through the hole,
   wherein each bolt comprises a head, a first shaft portion proximate to the head without threads having a first diameter and a second shaft portion distal from the head with threads having a second diameter larger than the first diameter, and each bolt retainer assembly further comprises a sleeve retaining the bolt with a restriction having an internal diameter smaller than the second diameter but larger than the first diameter.

2. The base plate assembly of claim 1 further comprising one or more nut retainers assemblies each having a nut, associated with one of the one or more holes without a bolt retainer assembly.

3. The base plate assembly of claim 1, wherein the restriction comprises one or more set screws through a wall of the sleeve.

4. The base plate assembly of claim 1, wherein the restriction comprises one or more spring pins through a wall of the sleeve.

5. The base plate assembly of claim 1, wherein the sleeve is pivotably connected to a retainer clip affixed to the base plate.

6. The base plate assembly of claim 5, wherein the sleeve is further slidably connected to the retainer clip, and the sleeve abuts the base plate in the engaged orientation.

7. The base plate assembly of claim 1 wherein each bolt retainer assembly further comprises a spring pin that retains the bolt when in the retracted orientation.

8. A base plate assembly for supporting a structural member on a floor surface comprising:
   a substantially planar base plate, having one or more holes through the base plate;
   one or more supports to support the base plate above the floor surface, forming a cavity between the base plate and the floor surface; and
   one or more bolt retainer assemblies each having a bolt, associated with one of the one or more holes, each bolt retainer assembly having an engaged orientation retaining the bolt through the hole and an retracted orientation retaining the bolt within the cavity and not through the hole,
   wherein each bolt retainer assembly further comprises a spring pin that retains the bolt when in the retracted orientation.

9. The base plate assembly of claim 8, further comprising one or more nut retainers assemblies each having a nut, associated with one of the one or more holes without a bolt retainer assembly.

10. The base plate assembly of claim 8, wherein each bolt comprises a head, a first shaft portion proximate to the head without threads having a first diameter and a second shaft portion distal from the head with threads having a second diameter larger than the first diameter, and each bolt retainer assembly further comprises a sleeve retaining the bolt with a restriction having an internal diameter smaller than the second diameter but larger than the first diameter, and wherein the restriction comprises one or more set screws through a wall of the sleeve.

11. The base plate assembly of claim 8, wherein each bolt comprises a head, a first shaft portion proximate to the head without threads having a first diameter and a second shaft portion distal from the head with threads having a second diameter larger than the first diameter, and each bolt retainer assembly further comprises a sleeve retaining the bolt with a restriction having an internal diameter smaller than the second diameter but larger than the first diameter, and wherein the restriction comprises one or more spring pins through a wall of the sleeve.

12. The base plate assembly of claim 8, wherein each bolt comprises a head, a first shaft portion proximate to the head without threads having a first diameter and a second shaft portion distal from the head with threads having a second diameter larger than the first diameter, and each bolt retainer assembly further comprises a sleeve retaining the bolt with a restriction having an internal diameter smaller than the second diameter but larger than the first diameter, and wherein the sleeve is pivotably connected to a retainer clip affixed to the base plate.

13. The base plate assembly of claim 12, wherein the sleeve is further slidably connected to the retainer clip, and the sleeve abuts the base plate in the engaged orientation.

* * * * *